(12) United States Patent
Lindemann et al.

(10) Patent No.: US 10,829,402 B2
(45) Date of Patent: Nov. 10, 2020

(54) BALLASTED SOLIDS TREATMENT SYSTEM AND METHOD

(71) Applicant: Evoqua Water Technologies LLC, Pittsburgh, PA (US)

(72) Inventors: Timothy Lindemann, Jefferson, WI (US); Michael Casey Whittier, Vernon, WI (US)

(73) Assignee: Evoqua Water Technologies LLC, Pittsburgh, PA (US)

( * ) Notice: Subject to any disclaimer, the term of this patent is extended or adjusted under 35 U.S.C. 154(b) by 0 days.

(21) Appl. No.: 16/307,671

(22) PCT Filed: Jun. 7, 2017

(86) PCT No.: PCT/US2017/036255
§ 371 (c)(1),
(2) Date: Dec. 6, 2018

(87) PCT Pub. No.: WO2017/214216
PCT Pub. Date: Dec. 14, 2017

(65) Prior Publication Data
US 2019/0194049 A1 Jun. 27, 2019

Related U.S. Application Data

(60) Provisional application No. 62/346,786, filed on Jun. 7, 2016.

(51) Int. Cl.
*C02F 9/00* (2006.01)
*C02F 3/12* (2006.01)
(Continued)

(52) U.S. Cl.
CPC .............. *C02F 9/00* (2013.01); *C02F 3/1226* (2013.01); *C02F 1/283* (2013.01); *C02F 1/488* (2013.01);
(Continued)

(58) Field of Classification Search
CPC ...... C02F 2305/12; C02F 1/283; C02F 1/488; C02F 1/5245; C02F 1/56; C02F 3/1226;
(Continued)

(56) References Cited

U.S. PATENT DOCUMENTS 4,981,593 A * 1/1991 Priestley ................. C02F 1/488
210/613
8,470,172 B2 * 6/2013 Woodard .............. C02F 3/1263
210/189

(Continued)

FOREIGN PATENT DOCUMENTS

WO WO-2014205005 A1 * 12/2014 .............. C02F 3/307

OTHER PUBLICATIONS

Young, "Design Considerations for BioMag Facilities" GHD WEFTEC, Dec. 31, 2014.

(Continued)

*Primary Examiner* — Nam X Nguyen
*Assistant Examiner* — Julia L. Wun

(57) ABSTRACT

Disclosed are apparatus and methods for treating wastewater. In one example a system for treating wastewater treatment is provided. The system comprises a biological reactor having an inlet in fluid communication with a source of wastewater and an outlet, the biological reactor configured to treat wastewater from the source of wastewater and output a biologically treated wastewater from the outlet, a solids-liquid separation system having an inlet in fluid communication with the outlet of the biological reactor and configured to separate the biologically treated wastewater into a solids-lean effluent and a solids-rich waste activated sludge (WAS), a treatment subsystem comprising a digester, an inlet in fluid communication with a WAS outlet of the solids-liquid separation system, and an outlet for providing ballasted and digested WAS, and a ballast feed system (Continued)

configured to deliver ballast to one of the biological reactor and the treatment subsystem.

19 Claims, 9 Drawing Sheets

(51) Int. Cl.
| | | |
|---|---|---|
| *C02F 1/48* | (2006.01) | |
| *C02F 1/52* | (2006.01) | |
| *C02F 1/56* | (2006.01) | |
| *C02F 11/04* | (2006.01) | |
| *C02F 1/28* | (2006.01) | |
| *C02F 11/147* | (2019.01) | |
| *C02F 11/145* | (2019.01) | |
| *C02F 11/127* | (2019.01) | |
| *C02F 103/32* | (2006.01) | |
| *C02F 103/34* | (2006.01) | |

(52) U.S. Cl.
CPC .............. *C02F 1/5245* (2013.01); *C02F 1/56* (2013.01); *C02F 3/1263* (2013.01); *C02F 3/1278* (2013.01); *C02F 11/04* (2013.01); *C02F 11/127* (2013.01); *C02F 11/145* (2019.01); *C02F 11/147* (2019.01); *C02F 2103/32* (2013.01); *C02F 2103/34* (2013.01); *C02F 2209/005* (2013.01); *C02F 2209/20* (2013.01); *C02F 2301/046* (2013.01); *C02F 2303/18* (2013.01); *C02F 2305/12* (2013.01); *Y02W 10/15* (2015.05)

(58) Field of Classification Search
CPC ...... C02F 3/1263; C02F 3/1278; C02F 11/04; C02F 11/147; C02F 11/145; C02F 11/127; C02F 2103/32; C02F 2103/34; C02F 2209/005; C02F 2209/20; C02F 9/00; C02F 2301/046; C02F 2303/18; C02F 2203/004; Y02W 10/15
USPC ....... 210/620, 705, 723, 738, 768, 787, 791, 210/800
See application file for complete search history.

(56) References Cited

U.S. PATENT DOCUMENTS

| | | | |
|---|---|---|---|
| 2007/0163955 A1 | 7/2007 | Sun | |
| 2008/0223783 A1 | 9/2008 | Sutton | |
| 2014/0001119 A1 | 1/2014 | Woodard | |
| 2014/0339158 A1 | 11/2014 | DiMassimo et al. | |
| 2016/0083268 A1* | 3/2016 | Erdogan | C02F 3/2866 210/605 |
| 2016/0130164 A1 | 5/2016 | Whittier et al. | |

OTHER PUBLICATIONS

Supplementary European Search Report for corresponding EP 1781095, dated Dec. 17, 2019.

* cited by examiner

BALLASTED SOLIDS TREATMENT SYSTEM AND METHOD

RELATED APPLICATIONS

This application claims priority under 35 U.S.C. § 119(e) to U.S. Provisional Application Ser. No. 62/346,786, titled "BALLASTED SOLIDS DIGESTER PRE-CONDITIONING," filed on Jun. 7, 2016, which is herein incorporated by reference in its entirety.

BACKGROUND

Technical Field

The technical field relates generally to wastewater treatment systems which utilize ballast to treat solids and recover ballast from treated solids.

Background Discussion

Various methods for the treatment of wastewater involve biological treatment of the wastewater in aerobic and/or anaerobic treatment units to reduce the total organic content and/or biochemical oxygen demand of the wastewater. The treatment methods may include physical and/or chemical treatment of wastewater in coagulation and/or flocculation units using coagulants and/or polymers to remove organic and/or inorganic contaminants from the wastewater. Various methods of wastewater treatment may also involve the removal of flocculated solids formed by a coagulation/flocculation process from treated wastewater. These forms of biological, physical and/or chemical treatment typically result in the formation of sludge. Sludge may comprise dead bacteria and byproducts of the biological treatment. In some methods, the sludge is removed from the wastewater after undergoing biological, physical, and/or chemical treatment by settling in a settling unit or clarifier.

SUMMARY

Aspects and embodiments are directed to systems and methods for treating wastewater. In accordance with an aspect of the present disclosure there is provided a system for treating wastewater. The wastewater treatment system comprises a biological reactor having an inlet in fluid communication with a source of wastewater and an outlet, the biological reactor configured to treat wastewater from the source of wastewater and output a biologically treated wastewater from the outlet, a solids-liquid separation system having an inlet in fluid communication with the outlet of the biological reactor and configured to separate the biologically treated wastewater into a solids-lean effluent and a solids-rich waste activated sludge (WAS), a treatment subsystem comprising a digester, an inlet in fluid communication with a WAS outlet of the solids-liquid separation system, and an outlet for providing ballasted and digested WAS, and a ballast feed system configured to deliver ballast to one of the biological reactor and the treatment subsystem.

In accordance with some embodiments the system further comprises a ballast recovery system configured to receive the ballasted and digested WAS from the outlet of the treatment subsystem. In accordance with some embodiments the ballast recovery system is further configured to separate unballasted digested WAS from ballast in the ballasted and digested WAS, and to provide recovered ballast as a source of ballast that is delivered to one of the biological reactor and the treatment subsystem.

In accordance with some embodiments the digester of the treatment subsystem has an inlet for receiving ballasted WAS and is configured to provide the ballasted and digested WAS to the outlet of the treatment subsystem. In accordance with some embodiments the ballast feed system is configured to feed ballast to the biological reactor. In accordance with some embodiments the WAS provided by the solids-liquid separation system is the ballasted WAS received by the inlet of the digester.

In accordance with some embodiments the treatment subsystem further comprises a holding tank positioned upstream from the digester and having an outlet for providing the ballasted WAS to the inlet of the digester. In accordance with some embodiments the holding tank is configured to thicken the ballasted WAS. In accordance with some embodiments the holding tank is in fluid communication with the inlet of the treatment subsystem, and the ballast feed system is configured to feed ballast to the holding tank of the treatment subsystem. In accordance with some embodiments the holding tank is configured to incorporate ballast into the WAS to generate the ballasted WAS.

In accordance with some embodiments the treatment subsystem further comprises a ballast impregnation system in fluid communication with the inlet of the treatment subsystem and positioned upstream from the holding tank, and the ballast feed system is configured to feed ballast to the ballast impregnation system. In accordance with some embodiments the ballast impregnation system is configured to incorporate ballast into the WAS to generate the ballasted WAS and provide the ballasted WAS to an inlet of the holding tank.

In accordance with some embodiments the treatment subsystem is configured to receive at least one of a coagulant, a flocculant, and an adsorbent.

In accordance with some embodiments the ballast comprises at least one of a magnetic material and sand. In accordance with some embodiments the magnetic material is magnetite.

In accordance with another aspect of the present disclosure, there is provided a method of treating wastewater. The method comprises receiving wastewater from a source of wastewater in a biological treatment unit, biologically treating the wastewater in the biological treatment unit to produce a biologically treated wastewater, settling the biologically treated wastewater to generate waste activated sludge (WAS), ballasting one of the WAS and the wastewater with a ballast to generate ballasted WAS, and digesting at least a portion of the ballasted WAS to produce ballasted and digested WAS.

In accordance with some embodiments the method further comprises passing the ballasted and digested WAS through a ballast recovery system to produce recovered ballast and unballasted digested WAS. In accordance with some embodiments ballasting one of the WAS and the wastewater with a ballast comprises introducing recovered ballast to the WAS after settling and prior to digesting. In accordance with some embodiments ballasting the WAS comprises introducing the recovered ballast to a ballast impregnation system and impregnating the WAS with the recovered ballast. In accordance with some embodiments the method further comprises thickening the ballasted WAS prior to digestion.

In accordance with another aspect of the present disclosure, there is provided a method of treating wastewater. The method comprises receiving wastewater from a source of wastewater in a biological treatment unit, biologically treating the wastewater in the biological treatment unit to produce a biologically treated wastewater, settling the biologically treated wastewater to generate waste activated sludge (WAS), and ballasting the WAS with a ballast to generate ballasted WAS.

In accordance with some embodiments the method further comprises passing the ballasted WAS to a ballast recovery system to produce recovered ballast. In accordance with some embodiments ballasting the WAS comprises impregnating the WAS with the recovered ballast. In accordance with some embodiments the method further comprises thickening the ballasted WAS prior to passing the ballasted WAS to the ballast recovery system.

One or more further aspects of the present disclosure are directed to a method of facilitating treatment of wastewater in a wastewater treatment system. The method of facilitating can comprise receiving wastewater from a source of wastewater in a biological treatment unit, biologically treating the wastewater in the biological treatment unit to produce a biologically treated wastewater, settling the biologically treated wastewater to generate waste activated sludge (WAS), providing a ballast feed system configured to deliver ballast to one of the wastewater and the WAS, ballasting the one of the WAS and the wastewater with the delivered ballast to generate ballasted WAS; and digesting at least a portion of the ballasted WAS to produced ballasted and digested WAS.

One or more further aspects of the present disclosure are directed to a method of facilitating treatment of wastewater in a wastewater treatment system. The method of facilitating can comprise receiving wastewater from a source of wastewater in a biological treatment unit, biologically treating the wastewater in the biological treatment unit to produce a biologically treated wastewater, settling the biologically treated wastewater to generate waste activated sludge (WAS), providing a ballast feed system configured to deliver ballast to the WAS, and ballasting the WAS with the delivered ballast to generate ballasted WAS.

Still other aspects, embodiments, and advantages of these example aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Embodiments disclosed herein may be combined with other embodiments, and references to "an embodiment," "an example," "some embodiments," "some examples," "an alternate embodiment," "various embodiments," "one embodiment," "at least one embodiment," "this and other embodiments," "certain embodiments," or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Figure 1:
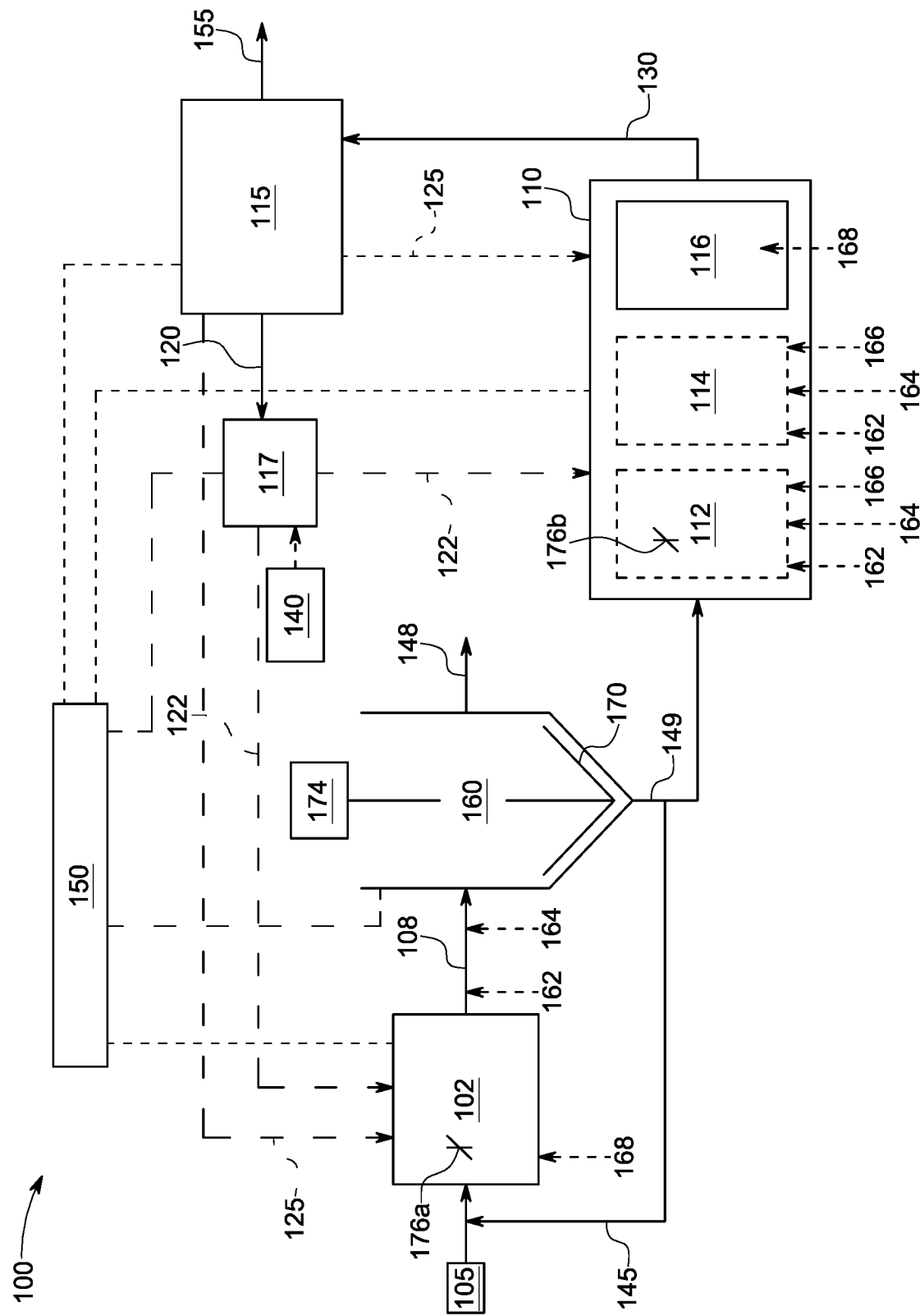
FIG. 1 is a schematic of one example of a wastewater treatment system in accordance with aspects of the present disclosure.

Municipal or industrial wastewater treatment systems include biological treatment units that produce waste activated sludge (WAS). WAS is typically removed from the treatment process and may undergo further processing. Processes that improve the settling properties of WAS can beneficially impact wastewater treatment plants by reducing the size of solids-liquid separation systems, such as centrifuges or clarifiers, and providing increased efficiency to the system, such as by increasing the flow rate through the separation systems, and reducing transport and/or disposal costs.

The aspects disclosed herein are not limited in their application to the details of construction and the arrangement of components set forth in the following description or illustrated in the accompanying drawings. These aspects are capable of assuming other embodiments and of being practiced or of being carried out in various ways. Examples of specific implementations are provided herein for illustrative purposes only and are not intended to be limiting. In particular, acts, components, elements, and features discussed in connection with any one or more embodiments are not intended to be excluded from a similar role in any other embodiments.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated reference is supplementary to that of this document; for irreconcilable inconsistencies, the term usage in this document controls.

Wastewater treatment facilities often include primary, secondary, and tertiary processes to treat wastewater to remove contaminants, such as suspended solids, biodegradable organics, phosphorus, nitrogen, microbiological contaminants, and the like, to provide a clean effluent.

The first or primary treatment process typically involves mechanically separating large solids and other suspended matter in the wastewater from the less dense solids and liquid in the wastewater. Primary treatment processes are typically done in sedimentation tanks using gravity and provide a primary effluent.

Secondary treatment typically includes biological treatment of the primary effluent. The biological treatment units or vessels used for secondary treatment typically include bacteria that break down components of the wastewater, such as organic components. The biological treatment processes in the biological treatment units or vessels may reduce the total organic content and/or biochemical oxygen demand of the wastewater. Biological treatment processes often result in the formation of floc, which refers to aggregations of suspended particles or solids, and includes biological, physical, and/or chemical floc.

Activated sludge is one type of secondary process that utilizes an aeration tank(s) that contains microorganisms that ingest contaminants in the primary effluent to form biological flocs. Oxygen is typically fed into the aeration tank(s) to promote grown of these biological flocs. The microorganisms of the activated sludge consume and digest suspended and colloidal organic solids by breaking down complex organic molecules into simple waste products that may, in turn, be broken down by other microorganisms. The microorganisms in the aeration tank grow and multiply as allowed by the quantities of air and consumable solids available. The combination of primary effluent, or in some cases raw sewage, and biological flocs is commonly known as "mixed liquor."

Mixed liquor from the aeration tank is directed to a solids-liquid separation system such as a secondary clarifier or secondary sedimentation tank. During the separation process, biological flocs in the mixed liquor are separated from the mixed liquor as settled sludge and the secondary effluent, or "clean" effluent, may be discharged back to the environment or undergo further treatment using tertiary treatment processes. The settled sludge in the secondary clarifier may be recycled back to the aeration tank(s) by a return activated sludge subsystem. The remaining excess sludge is typically wasted from the system to control the population of microorganisms in the mixed liquor, otherwise referred to as mixed liquor suspended solids (MLSS).

The settling vessels or clarifiers of the solids-liquid separation system are used to remove suspended solids, including biological, physical, and/or chemical floc (referred to herein as "floc") and/or sludge from the wastewater subsequent to biological, physical, and/or chemical treatment. Floc may have a density close to that of water (1.0 g/cm$^3$).

Gravitational settling of floc and/or other suspended solids having a density close to that of the medium, for example, water, in which they are entrained will typically occur slowly, if at all. Settling and removal of floc in a settling vessel or clarifier may require a long retention time and therefore the secondary clarifier may be a bottleneck in the wastewater treatment process.

One process which may be used to improve the settling of floc in the solids-liquid separation system such as the secondary clarifier is to impregnate the floc with a weighting agent or ballast that will bond to the floc and form a "ballasted floc." Impregnating the floc with a ballast will thus cause the floc to settle much more rapidly than it would otherwise settle. Ballasted systems may comprise a ballast reactor tank configured to provide a ballasted effluent and a source of ballast material fluidly connected to the ballast reactor tank. One or more additives may also be introduced to the ballast reactor tank to aid in increasing the specific gravity of the floc. Non-limiting examples of such additives include coagulants, such as ferric sulfates, flocculants, such as anionic polymers, and adsorbents, such as powdered activated carbon (PAC). The addition of ballast, and optionally one or more additives, improves the removal of dissolved, colloidal, particulate, and microbiological solids. The precipitation and enhanced settleability of ballasted solids provides for a more efficient solids-liquid separation system. For example, the clarification step is faster, which allows for smaller separation systems as compared to conventional clarification systems that comprise biological and clarification steps.

A system for treating wastewater in accordance with at least one embodiment is illustrated schematically in FIG. 1, indicated generally at 100. The system includes at least one biological reactor 102, a solids-liquid separation system 160, a treatment subsystem 110, and a ballast feed system 117. The wastewater treatment system 100 may also include a controller 150 for controlling one or more components of the system 100. The wastewater treatment system 100 may be configured to treat wastewater from one or more sources of wastewater 105. For instance, the wastewater 105 (also referred to herein as "feed wastewater") may be municipal wastewater or industrial wastewater, such as output wastewater from electric power plants, agricultural and food operations, chemical plants, or manufacturing plants.

The biological reactor(s) 102 may have an inlet and an outlet. The inlet of the biological reactor 102 may be in fluid communication with the source of wastewater 105. The biological reactor 102 is configured to treat the wastewater 105, including primary effluent from a primary separation process. For instance, the biological reactor 102 may be configured as an aeration tank as described above to biologically treat the wastewater and output a biologically treated wastewater 108 through the outlet of the biological reactor. The biological reactor 102 may include a source of air or oxygen 168 that is introduced to a population of microorganisms for purposes of promoting growth of biological flocs in mixed liquor. The mixed liquor includes a combination of wastewater and biological flocs and resides in the biological reactor 102 until a predetermined concentration of mixed liquor suspended solids (MLSS) is achieved. For example, in some instances the concentration of MLSS is about 8000 mg/L, although this value may depend on the different factors, such as the application and the size of the facility.

The biological reactor 102 may include a source of air 168 to introduce oxygen to the microorganisms residing in the reactor. A mixer 176a may also be used in the biological reactor 102 for maintaining floc material in suspension. A flocculant 162 and/or a coagulant 164 may be added to biologically treated wastewater 108 exiting the biological reactor 102. For instance, an injection port positioned downstream from the biological reactor 102 may be used for injecting a flocculant 162 and/or coagulant 164 into the biologically treated wastewater 108.

Flocculation may be described as a process of contact and adhesion whereby particles and colloids in liquid such as a water or wastewater form larger-sized clusters of material. The flocculant 162 may comprise a material or a chemical that promotes flocculation by causing colloids and particles or other suspended particles in liquids to aggregate, forming a floc. The effect causes particles to cluster together into a floc. The flocculant 162 therefore enhances the formation of WAS 149 in the solids-liquid separation system 160. Certain polymers may be used as flocculants. For example, polyacrylamides are one non-limiting example of a suitable flocculant that may be used according to one or more embodiments. Anionic polymers may be created by copolymerizing acrylamide with acrylic acid, and cationic polymers may be prepared by copolymerizing acrylamide with a cationic monomer. Modified polyacrylamides are also an example of a polymer that may be used as a flocculant. In one example, the flocculant 162 may be an anionic polyacrylamide such as Drewfloc® 2270 (Ashland Chemical, Boonton, N.J.).

Coagulation may be described as a process of consolidating particles, such as colloidal solids. A coagulant may include cations or other positively charged molecules, such as cations of aluminum, iron, calcium, and magnesium. The cations are capable of interacting with negatively charged particles and molecules such that barriers to aggregation are reduced. For instance, the coagulant 164 may remove phosphorus from the biologically treated wastewater 108. Non-limiting examples of a coagulant 164 include bentonite clay, polyaluminum chloride, polyaluminium hydroxychloride, aluminum chloride, aluminum chlorohydrate, aluminum sulfate, ferric chloride, ferric sulfate, and ferrous sulfate monohydrate.

The wastewater treatment system 100 also includes a solids-liquid separation system 160 positioned downstream from the biological reactor 102. The solids-liquid separation system 160 may have an inlet and an outlet. The inlet of the solids-separation system 160 is in fluid communication with the outlet of the biological reactor 102. After sufficient treatment in the biological reactor 102, biological treated wastewater 108 enters the solids-liquid separation system 160, which is configured to separate the biologically treated wastewater 108 into a solids-lean effluent 148 and a solids-rich waste activated sludge (WAS) 149. The separation process may include one or more biological, physical, and/or chemical treatment units or vessels, and separation may be accomplished using any one of a variety of methods. The separation mechanism shown in the solids-liquid separation system 100 of FIG. 1 is gravity such that WAS 149 collects at the bottom of the solids-liquid separation system 160 and solids-lean effluent 148 is extracted near or from the top. The solids-separation system 160 may further include a scraper 170 driven by a motor 174. The scraper 170 may facilitate directing WAS into the outlet of the solids-separation system 160. Other devices may also be used to enhance separation in the solids-liquid separation system 160 and are within the scope of this disclosure.

A portion of the WAS exiting the solids-separation system 160 may be recycled back to the biological reactor 102 as return activated sludge (RAS) 145. For purposes of simplicity, each of the systems shown in FIGS. 1, 1A, 1B, 1C, and 4 indicate this recycled sludge as RAS 145.

Although the system 100 of FIG. 1 uses gravity as a separation mechanism in solids-liquid separation system 160, other separation mechanisms and systems may also be used. For instance, centrifuges or chemical separation techniques may also be used or applied to aid in separating WAS from the biological treated wastewater 108. Dissolved air flotation (DAF) clarifiers may also be used as a solids-liquid separation system.

The wastewater treatment system 100 of FIG. 1 shows an embodiment where the biological treatment of the wastewater occurs in a separate vessel (i.e., biological reactor 102) than the settling/separation process (i.e., solids-liquid separation system 160). According to another embodiment the biological and settling processes are combined in a single reaction vessel, such as a sequencing batch reactor (SBR).

The wastewater treatment system 100 also includes ballast feed system 117. The ballast feed system 117 is configured to deliver ballast to one of the biological reactor 102 and the treatment subsystem 110 (discussed below). Ballasted systems include the addition of a ballast 122, and optionally, a coagulant and/or flocculant (discussed further below) to improve the removal of dissolved, colloidal, particulate, and microbiological solids.

The ballast feed system 117 may obtain ballast 122 from one or more sources. For instance, recovered ballast 120 from ballast recovery system 115 (discussed below) may be delivered to the ballast feed system 117. In addition, fresh or raw ballast 140 may be delivered and used by the ballast feed system 117. The source of ballast may comprise a powdered ballast, and may be added in dry powdered form (i.e., not be in a liquid). In some embodiments, the ballast 122 may be added by an operator or by machinery, such as by a dry feeder.

The ballast 122 may be provided in the form of small particles or as a powder. The particle sizes of the powder may be in a range of, for example, from about 1 micron to about 1000 microns in diameter. In some embodiments, the particle size of the powder may be in a range of from about 1 micron to about 720 microns in diameter. According to one embodiment, the particle size of the powder may be in a range of from about 1 micron to about 720 microns in diameter, with 50% of the particles having a diameter that is less than 13 microns. According to another embodiment, the particle size of the powder may be in a range of from about 1 micron to about 720 microns in diameter, with 50% of the particles having a diameter that is less than 40 microns. According to certain embodiments, the particle size of the ballast 122 may be less than about 100 microns. In some embodiments, the particle size of the ballast may be less than about 40 microns. In one embodiment, the particle size of the ballast 122 may be less than about 20 microns. In some embodiments, the particle size of the ballast may be between about 80 microns to about 100 microns, between about 60 microns to about 80 microns, between about 40 microns to about 60 microns, between about 20 microns to about 40 microns, or between about 1 micron to about 20 microns. Different sizes of ballast may be utilized in different embodiments depending, for example, on the nature and quantity of floc and/or other suspended solids to be removed in a settling process. The benefit of ballast 122 is to increase the efficiency of separating liquids from solids which increases the efficiency of the clarification performed in the solids-liquid separation system 160 and/or a thickening process performed in the holding tank 114 of the treatment subsystem 110.

According to one embodiment, the ballast 122 (otherwise referred to herein as a "weighting agent") may comprise a magnetic ballast. The magnetic ballast may comprise an inert material. The magnetic ballast may comprise a ferromagnetic material. The magnetic ballast may comprise iron-containing material. In certain embodiments, the magnetic ballast may comprise an iron oxide material. For example, the magnetic ballast may comprise magnetite. Magnetite has a much higher density, approximately 5.1 g/cm$^3$, than typical floc formed in biological, physical, and/or chemical wastewater treatment methods. Magnetite is a fully oxidized iron ore ($Fe_3O_4$). Magnetite is inert, does not rust, and does not react or otherwise interfere with chemical or biological floc. Magnetite also does not stick to metal, meaning that while it is attracted to magnets, it does not attach to metal surfaces, such as steel pipes. The magnetic ballast may have a particle size that allows it to bind with biological and chemical flocs to provide enhanced settling or clarification, and allows it to be attracted to a magnet so that it may be separated from the flocs.

According to other embodiments, the ballast 122 may comprise sand. Sand ballasted systems may implement larger ballast sizes to effectively recover the ballast. For instance, sand particles may range in size from 50 microns to about 2000 microns. Sand ballast is non-magnetic. Sand ballasted systems and methods may implement the use of cleaning agents to separate the biological solids from the sand particle ballast. The use of a cleaning agent may be related to the large surface area of the sand ballast where bacteria attach to the sand material. Mechanical energy alone (i.e., shearing forces from a vortex flow pattern) may be insufficient for removing biological solids from the surface of the sand particle and chemical methods may be utilized to react with and dissolve chemical bonds present on the surface of the sand particle that bind the sand to the biological solids.

Unlike sand-based ballast that requires growth of biological floc around relatively large-sized sand particles, magnetite ballast is smaller in size (e.g., less than 100 microns), allowing for the magnetite particles to impregnate existing biological floc.

In accordance with one embodiment, the use of a magnetic ballast may provide advantages over the use of other types of ballast material, such as sand. For instance, as described further below, a magnetic drum provided in the ballast recovery system 115 may be used to separate the biological solids from the magnetic ballast in an efficient manner.

Although magnetite may be utilized as ballast material in some aspects of the present disclosure, these aspects are not limited to the use of magnetite as the ballast 122. Other materials, including sand as discussed above may additionally or alternatively be used as a ballast material. Further materials which may additionally or alternatively be used as ballast materials include any materials which may be attracted to a magnetic field, for example, particles or powders comprising nickel, chromium, iron, and/or various forms of iron oxide. According to one embodiment, the ballast comprises at least one of a magnetic material and sand.

Returning to FIG. 1, the ballast feed system 117 may include one or more tanks or vessels where the recovered ballast 120 is combined with the raw ballast 140. The ballast feed system 117 may be equipped with a mixer (not shown) that mixes the ballast material prior to delivering the ballast to the one of the biological reactor 102 and the treatment subsystem 110.

In alternative embodiments, the ballast feed system 117 may comprise separate conduits that deliver ballast material to the biological reactor 102, an impregnation tank (discussed further below) or a holding tank (also discussed below). For example, one conduit of the ballast feed system 117 may transport fresh ballast 140, and a second conduit of the ballast feed system 117 may transport recovered ballast 120. Therefore, the fresh ballast 140 and the recovered ballast 120 may not be mixed together or otherwise combined prior to being introduced to these other system components. Thus, according to some embodiments, the wastewater treatment system 100 does not include a separate vessel used to mix and deliver ballast such as the ballast feed system 117. For instance, raw ballast 140 and recovered ballast 120 may be delivered to a ballast impregnation system and mixed with WAS 149 to form ballasted WAS, or ballast may be mixed with mixed liquor from the biological reactor 102, which settles to form ballasted WAS.

Figure 1A:
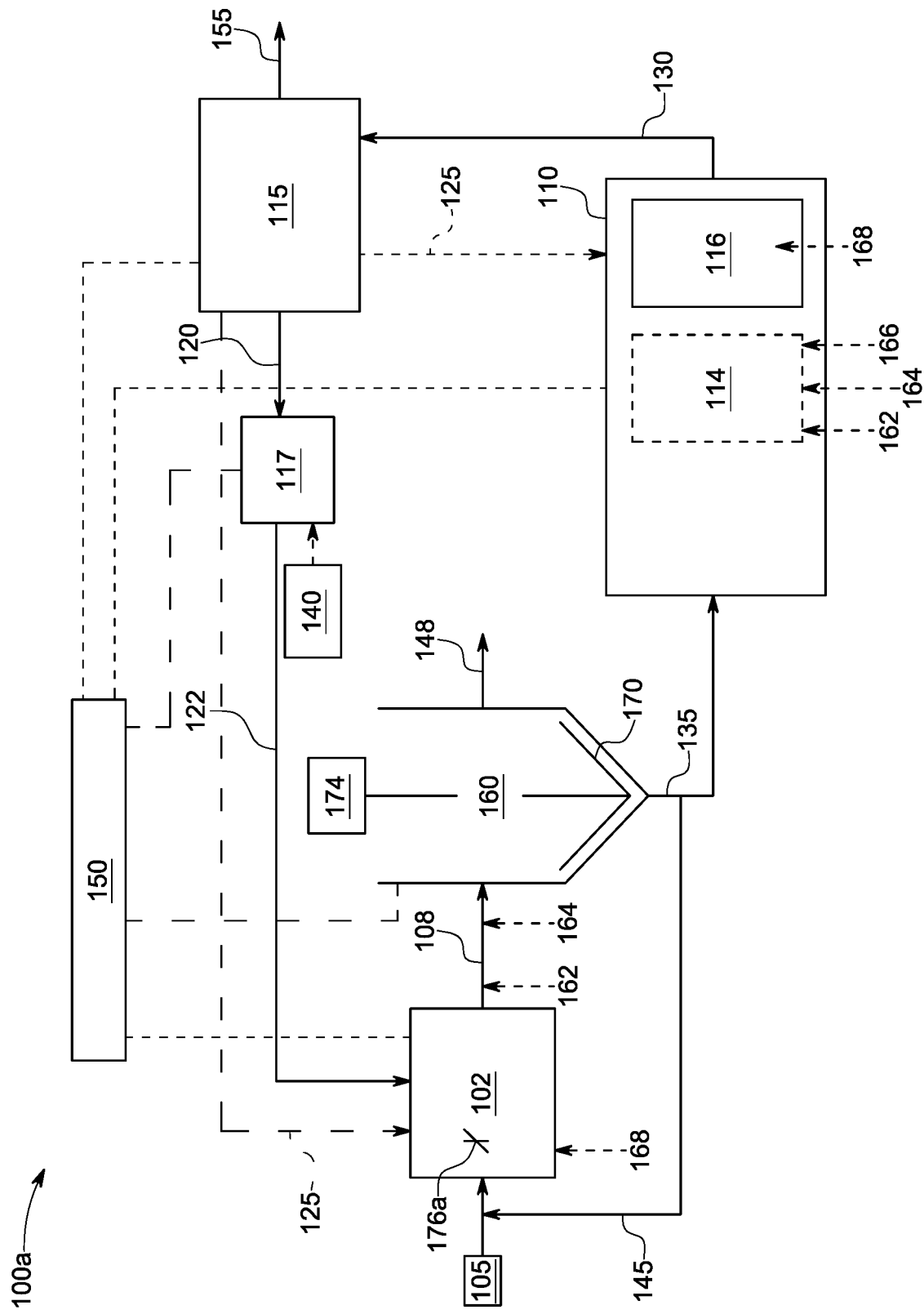
FIG. 1A is a schematic of another example of a wastewater treatment system in accordance with aspects of the present disclosure.

According to one embodiment, the ballast feed system 117 delivers ballast to the biological reactor 102, which is shown in further detail in the wastewater treatment system 100a of FIG. 1A. As described above, the ballast 122 mixes and bonds with floc in the mixed liquor of the biological reactor 102, which aids in settling the WAS in the solids-liquid separation system 160. In this type of configuration, the WAS 149 exiting the solids-liquid separation system 160 of FIG. 1 is ballasted WAS 135, as shown in FIG. 1A.

According to some embodiments, the ballasted WAS 135 has a concentration of ballast in a range of between zero and about 80 g/L, or up to about 8% by volume.

At least a portion of the ballasted WAS 135 exiting the solids-liquid separation system 160 may undergo further treatment in the treatment subsystem 110. The treatment subsystem 110 is positioned downstream from the solids-liquid separation system 160. The treatment subsystem 110 may perform one or more functions, including improving the settling properties of the ballasted WAS 135 and may include one or more subsystems, including a digester 116, and optionally, a holding tank 114, each of which is described in further detail below.

Ballasted WAS not sent to the treatment subsystem 110 may be recirculated back and re-introduced to the biological reactor 102 as RAS 145, as shown in FIG. 1A.

According to some embodiments, ballasted WAS 135 may be introduced to the holding tank 114 of the treatment subsystem 110 prior to being introduced to the digester 116. The ballasted WAS 135 may undergo thickening in the holding tank 114 to further concentrate solids of the ballasted WAS 135, and therefore the holding tank 114 may be configured to thicken the ballasted WAS 135 by increasing the solids content of the ballasted WAS 135. The term "thickening" may refer to any process that increases the concentration of solids present in the holding tank 114 by the separation of a portion of the liquid phase of these solids. Thickening therefore results in the removal of water from solids comprising the ballasted WAS 135 present in the holding tank 114. According to one embodiment, the holding tank 114 thickens the ballasted WAS to less than 10% (by volume) biological solids. In some embodiments, the holding tank 114 thickens the ballasted WAS to less than 8% biological solids. These values reflect the exclusion of ballast, and according to one example, the ballasted WAS may be thickened to less than 16% total solids when ballast is taken into consideration.

Thickening may be performed using any one or more techniques, including gravity settling, flotation, and centrifugation. In addition, the holding tank 114 may include a mixer and/or be aerated. According to some embodiments, gravity thickening is used as a thickening process whereby the force of gravity is used as the main agent in the settling and thickening process. During the thickening process, a sludge "blanket" will form over a high density underflow of sludge. The high density sludge material of the ballasted WAS 135 may be further treated in the digester 116 of the treatment subsystem 110. According to one example, the solids content of the ballasted WAS 135 entering the holding tank 114 is less than 2%, and after thickening, enters the digester 116 with a solids content of greater than 1%.

One or more of a flocculant 162, coagulant 164, and/or adsorbent 166 may be added to the ballasted WAS 135 to enhance thickening. One or more of these materials may be added to the holding tank 114, or may be added to the ballasted WAS 135 prior to entering the holding tank 114, either in a separate tank or in-line. For instance, coagulant 164 may be added to precipitate phosphorous, thereby reducing the phosphorous from supernatant removed from the process. Flocculant 162 may be used to further increase settling to enhance thickening. An adsorbent 166, discussed further below, may optionally be used.

Adsorption may be described as a physical and chemical process of accumulating a substance at the interface between liquid and solids phases. According to some embodiments, the adsorbent 166 may be a powdered activated carbon (PAC). PAC is an effective adsorbent because it is a highly porous material and provides a large surface area to which contaminants may adsorb. PAC may have a diameter of less than 0.1 mm and an apparent density ranging between 20 and about 50 lbs/ft$^3$ (between about 320 kg/m$^3$ and about 801 kg/m$^3$). PAC may have a minimum iodine number of 500 as specified by AWWA (American Water Works Association) standards.

The holding tank 114 is positioned upstream from the digester 116 such that the holding tank 114 is configured to deliver ballasted WAS 135 through an outlet of the holding tank 114 to an inlet of the digester 116. The digester 116 is configured to digest at least a portion of the ballasted WAS 135 to produce ballasted and digested WAS 130. As used herein, the term "digestion" refers to any process that includes microbial breakdown of the solids in the digester 116.

The digestion process functions to enhance the separation of ballast material from the WAS in the ballast recovery system 115, which is positioned downstream from the treatment subsystem 110. The digester 116 functions to biologically degrade solids of the ballasted WAS 135. The digestion process enhances settling properties in the digester 116 to allow further thickening. Digestion of the ballasted WAS 135 offers several advantages to recovery processes of the wastewater treatment system. Ballast that is not recovered as recovered ballast 120 may be supplemented with raw ballast 140. Increasing the percentage of recovered ballast 120 from the WAS reduces operation costs of the wastewater treatment system 100. According to various aspects, WAS entering the ballast recovery system 115 as ballasted and digested WAS 130 allows for enhanced recovery of ballast material than a system that does not subject WAS to ballasting and digestion. According to another aspect, ballasting and digesting WAS allows for the system to have enhanced recovery of biosolids than a system that does not include WAS ballasting and digestion.

The digester 116 may be configured to implement one or more digestion processes, including anaerobic digestion, aerobic digestion, and facultative digestion. Anaerobic digestion processes typically decompose or otherwise break down organic compounds present in the solids decompose in the absence of oxygen by facultative and anaerobic microorganisms which convert a substantial portion of the stored carbon into methane. In contrast, during aerobic digestion aerobic and facultative microorganisms use oxygen to produce mainly carbon dioxide and water. Therefore, the digester 116 may be in in fluid communication with a source of air or oxygen 168 for purposes of providing oxygen to aerobic digestion processes.

WAS, including ballasted WAS 135 entering the digester 116 may have a total dry solids (TS) concentration in a range of about 1-8% and a volatile solids (VS) concentration in a range of about 50-90%. According to one example, when ballast is taken into account, the WAS 135 entering the digester 116 may have a TS concentration in a range of about 1-16%, and a VS concentration in a range of about 20-90%. Once the digestion process is complete, the ballasted and digested WAS 130 exiting the digester may have similar TS and VS concentration values.

According to another embodiment, ballasted WAS 135 exiting the solids-separation system 160 of wastewater treatment system 100a may be directly introduced to the digester 116 of the treatment subsystem 110. Therefore, a separate holding tank 114 may not be used. The ballasted WAS 135 undergoes a digestion process as described above before being transferred to the ballast recovery system 115 as ballasted and digested WAS 130.

Figure 1B:
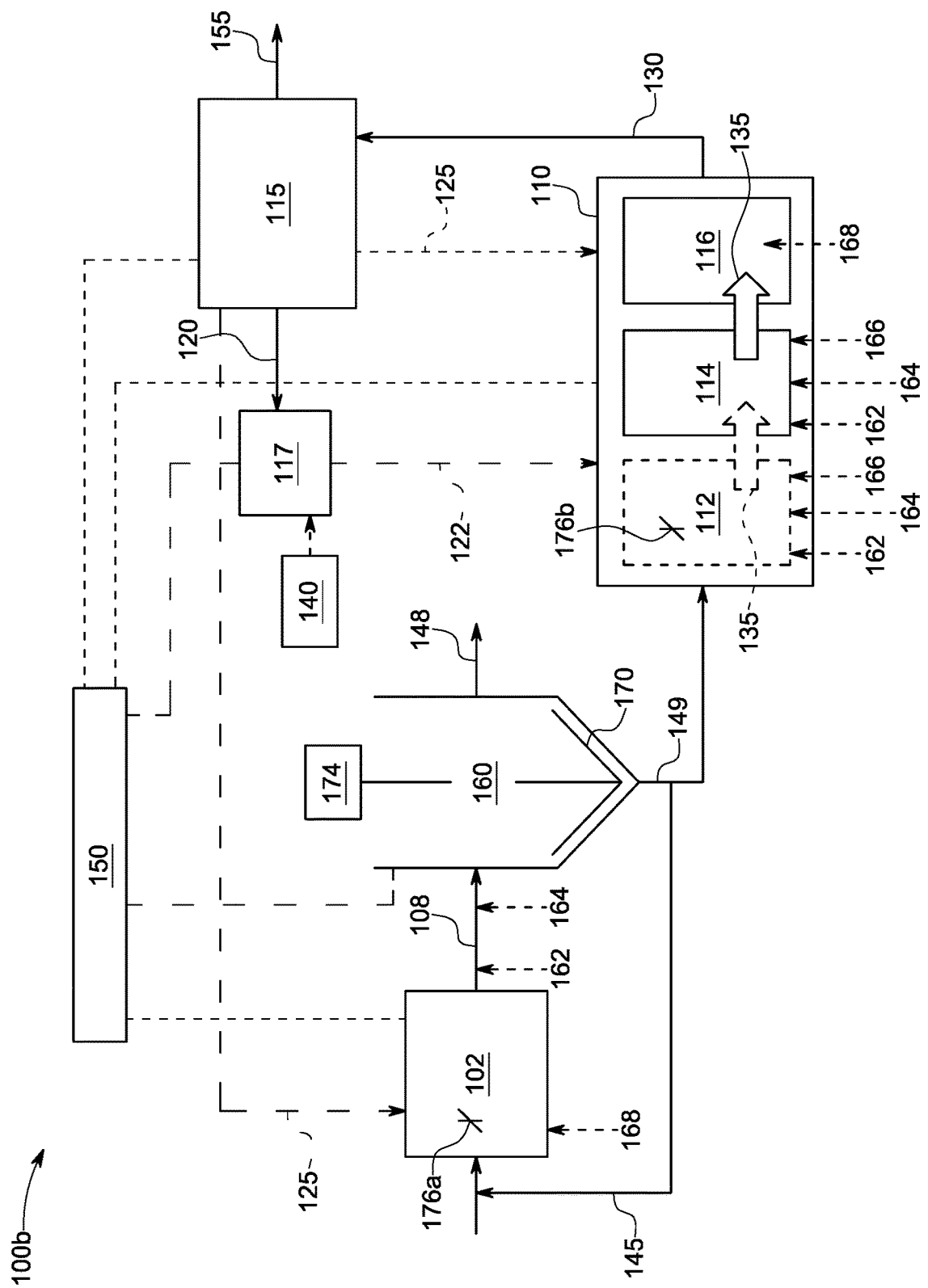
FIG. 1B is a schematic of another example of a wastewater treatment system in accordance with aspects of the present disclosure.

According to another embodiment, the ballast feed system 117 delivers ballast to the treatment subsystem 110, which is shown in further detail in the wastewater treatment system 100b of FIG. 1B. This type of configuration may be performed in systems where ballast is not introduced in any upstream biological or separation processes. WAS 149 exiting the solids-liquid separation system 160 may therefore not contain any ballast when it enters the treatment subsystem 110. Implementing ballasting systems in upstream or existing biological and separation systems may be expensive or otherwise difficult to perform. The configuration shown in the system 100b of FIG. 1B allows for municipalities to add ballast to WAS and enhance the thickening of WAS by implementing a ballasting process downstream from a planned or existing biological and separation treatment process.

As discussed above, the treatment subsystem 110 is positioned downstream from the solids-separation system 160, and may be configured to receive WAS 149 from the solids-liquid separation system 160, as discussed above in reference to FIG. 1A. In addition, the treatment system 110 may be configured to receive at least a portion of WAS 149, which is unballasted, from the solids-liquid separation system 160. The portion of WAS 149 not sent to the treatment subsystem 110 may be recirculated back and re-introduced to the biological reactor 102 as RAS 145, as shown in FIG. 1B.

The treatment subsystem 110 may perform one or more functions, including improving the settling properties of WAS 149 and may include one or more subsystems, including the digester 116 as discussed above, a holding tank 114, and optionally, a ballast impregnation system 112. Each of the ballast impregnation system 112, the holding tank 114, and the digester 116 may comprise one or more vessels or tanks, and may be positioned separately from one another to form their respective function, or in some instances, may be combined to perform multiple functions. For instance, according to one embodiment, ballast 122 may be introduced to the holding tank 114 and mixed with the WAS 149 exiting the solids-separation system 160 to form ballasted WAS 135. The holding tank 114 may therefore be configured to perform the function of the impregnation system 112.

As shown in FIG. 1B, according to some embodiments, the treatment subsystem 110 may include a ballast impregnation system 112 (otherwise referred to herein as simply an "impregnation system") where ballast 122 is introduced to and mixed with WAS 149 to form ballasted WAS 135. The impregnation system 112 may be in fluid communication with the inlet of the treatment subsystem 110 such that at least a portion of the WAS 149 exiting the solids-liquid separation system 160 enters the impregnation system 112. The impregnation system 112 is positioned upstream from the digester 116 of the treatment subsystem 110 and the holding tank 114. The impregnation system 112 may be configured to incorporate ballast 122 into the WAS 149 to generate ballasted WAS 135. The impregnation system 112 may include a mixer 176b that mixes the ballast with the WAS.

According to some embodiments, recovered ballast 120 and/or raw ballast 140 may be introduced directly to the impregnation system 112, and the impregnation system 112 is configured to mix the recovered ballast 120, raw ballast 140, and WAS 149 together to generate ballasted WAS 135. A separate ballast feed system 117 may therefore not be utilized.

Ballasted WAS 135 that exits the impregnation system 112 is provided to an inlet of the holding tank 114. The ballasted WAS 135 may then undergo a thickening process, as described above, before it is transferred to the digester 116, where it is digested to generate ballasted and digested WAS 130 that is delivered to the ballast recovery system 115.

According to an alternative embodiment, ballast 122 is introduced to the holding tank 114 of the treatment subsystem 110 and the holding tank 114 functions to incorporate ballast 122 into the WAS 149 to generate ballasted WAS 135. In this configuration, the treatment subsystem 110 may not include a separate impregnation system 112. The holding tank 114 may be in fluid communication with the inlet of the treatment subsystem 110 for purposes of receiving WAS 149 from the solids-liquid separation system 160, and the ballast feed system 117 may be configured to feed or otherwise deliver ballast 122 to the holding tank 114. In some instances, and as mentioned above, recovered ballast 120 and/or raw ballast 140 may be delivered directly to the holding tank 114 and the treatment system may not comprise a separate mixing vessel that functions as the ballast feed system 117. The holding tank 114 may include a mixer (not shown) used to mix the WAS 149 with the ballast material.

According to some embodiments, the ballasted WAS 135 generated by the treatment subsystem 110 has a concentration of ballast in a range of between zero and about 80 g/L, or up to about 8% by volume.

According to some embodiments, once the ballasted WAS 135 has been generated in the holding tank 114, it may undergo a thickening process, as described above, before it is transferred to the digester 116, where it is digested according to any of the digestion processes as previously described. The ballasted and digested WAS 130 is then delivered from the digester 116 to the ballast recovery system 115.

One or more of a flocculant 162, coagulant 164, and/or adsorbent 166 may be added to WAS 149 entering the treatment subsystem 110. One or more of these materials may be added directly to the impregnation system 112 and/or the holding tank 114, in line prior to entry of the WAS material into the impregnation system 112 and/or the holding tank 114, and/or may be introduced via separated tanks. For instance, according to one embodiment, the WAS 149 may be introduced to a coagulant tank, into which a coagulant 164 is added. The coagulated effluent may then be introduced to the impregnation system 112, into which the ballast 122 is added, and the ballasted effluent may then flow to a flocculant tank, into which a flocculant 162 is added. The flocculant effluent may then flow to the holding tank 114. According to another embodiment, a flocculant tank and flocculant 162 may not be included. In other embodiments, a coagulant tank and coagulant 162 may not be included.

The holding tank 114 of systems 100a and 100b shown in FIGS. 1A and 1B is positioned upstream from the digester 116 such that the holding tank 114 is configured to deliver ballasted WAS 135 through an outlet of the holding tank 114 to an inlet of the digester 116. In some embodiments, the holding tank 114 thickens the ballasted WAS 135. The ballasted WAS 135 may be delivered to the holding tank 114 from the impregnation system 112, or delivered from the solids-liquid separation system 160, or generated within the holding tank itself 114 (e.g., by mixing ballast with unballasted WAS such as WAS 149). The ballasted WAS 135 may then be introduced to the digester 116.

Figure 1C:
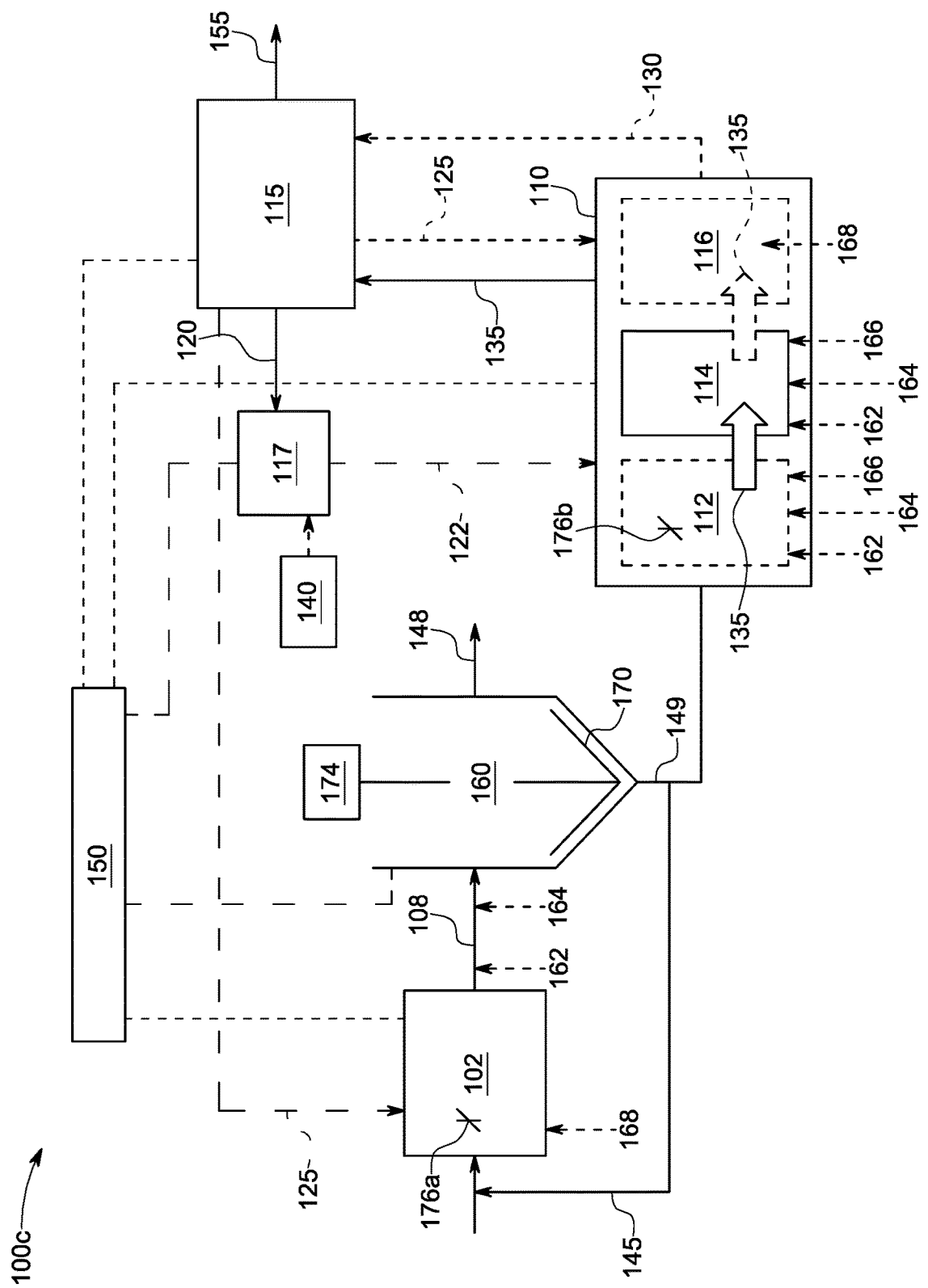
FIG. 1C is a schematic of yet another example of a wastewater treatment system in accordance with aspects of the present disclosure.

An alternative embodiment to system 100b of FIG. 1B is shown as system 100c in FIG. 1C. This system is similar to system 100b in that WAS 149 exiting the solids-liquid separation system 160 does not contain ballast when it enters the treatment subsystem 110. In addition, ballast 122 may be introduced to the holding tank 114 and mixed with the WAS 149 exiting the solids-separation system 160 to form ballasted WAS 135, and therefore the holding tank 114 may be configured to perform the function of the impregnation system 112. In the alternative, as discussed above, the impregnation system 112 may be configured to incorporate ballast 122 into the WAS 149 to generate ballasted WAS 135. The ballasted WAS 135 may then be introduced to the holding tank 114 to undergo a thickening process, as described above. However, in the configuration of system 100c of FIG. 1C, the digestion process is optional. Therefore, at least a portion of the ballasted WAS 135 may be sent to the ballast recovery system 115 without undergoing a digestion process in the digester 116.

Returning to FIG. 1, the wastewater treatment system 100 may further include a ballast recovery system 115. The ballast recovery system 115 may be configured to receive the ballasted and digested WAS 130 from an outlet of the treatment subsystem 110. For instance, ballasted and digested WAS 130 exiting the digester 116 may be introduced to the ballast recovery system 115. The ballast recovery system 115 is configured to separate unballasted digested WAS from ballast in the ballasted and digested WAS 130, and to provide recovered ballast 120 that is delivered to one of the biological reactor 102 and the treatment subsystem 110.

According to an alternative embodiment as shown in FIG. 1C, the ballast recovery system 115 is configured to receive ballasted WAS 135 from an outlet of the treatment subsystem 110. For instance, ballasted WAS 135 exiting the holding tank 114 may be introduced to the ballast recovery system 115. The ballast recovery system 115 in this instance is configured to separate unballasted WAS from ballast in the ballasted WAS 135, and to provide recovered ballast 120 that is delivered to the treatment subsystem 110 (such as the holding tank 114 or the impregnation system 112).

Recovery of ballast may occur using one or more techniques or devices, including specific gravity or magnetic separation methods that may include but are not limited to magnetic recovery drums, hydrocyclones, magnetic assisted hydrocyclones, classifying selectors, and flux selector columns. Using ballasted and digested WAS (or ballasted WAS) as the input stream to the ballast recovery system 115 may allow for several advantages over a substantially similar system that does not include the treatment subsystem 110. For instance, an amount of ballast material recovered by the ballast recovery system 115 may be higher than a substantially similar system that does not include the treatment subsystem 110 and does not use ballasted and/or digested WAS in the recovery system 115. An additional benefit of ballasting and/or digesting WAS is that more biosolids may be recovered, which means less sludge is wasted than a substantially similar system that does not implement the ballasting and digestion of WAS.

The ballast recovery system 115 may also be configured to provide unballasted WAS (FIG. 1C) or unballasted and digested WAS (FIGS. 1, 1A, 1B), both referred to in the figures as 125 and also referred to herein as "recovered WAS" to at least one of the biological reactor 102 and the treatment subsystem 110, including at least one of the impregnation system 112, holding tank 114, and digester 116. For instance, at least a portion of the recovered WAS 125 may be directed to the impregnation system 112 for purposes of impregnating floc material in the unballasted digested WAS with ballast. At least a portion of the recovered WAS 125 may be introduced to the holding tank 114 in instances where the holding tank 114 is configured to impregnate the floc material with ballast 122. In addition, at least a portion of the recovered WAS 125 may be introduced to the digester 116 for purposes of controlling the population of microorganisms in the digester 116. Recirculation of settled solids to at least one of the biological reactor 102 and the treatment subsystem further enhances performance and reliability, and allows for additional flexibility for treating and recovering process control during process upsets or start-up processes.

Figure 4:
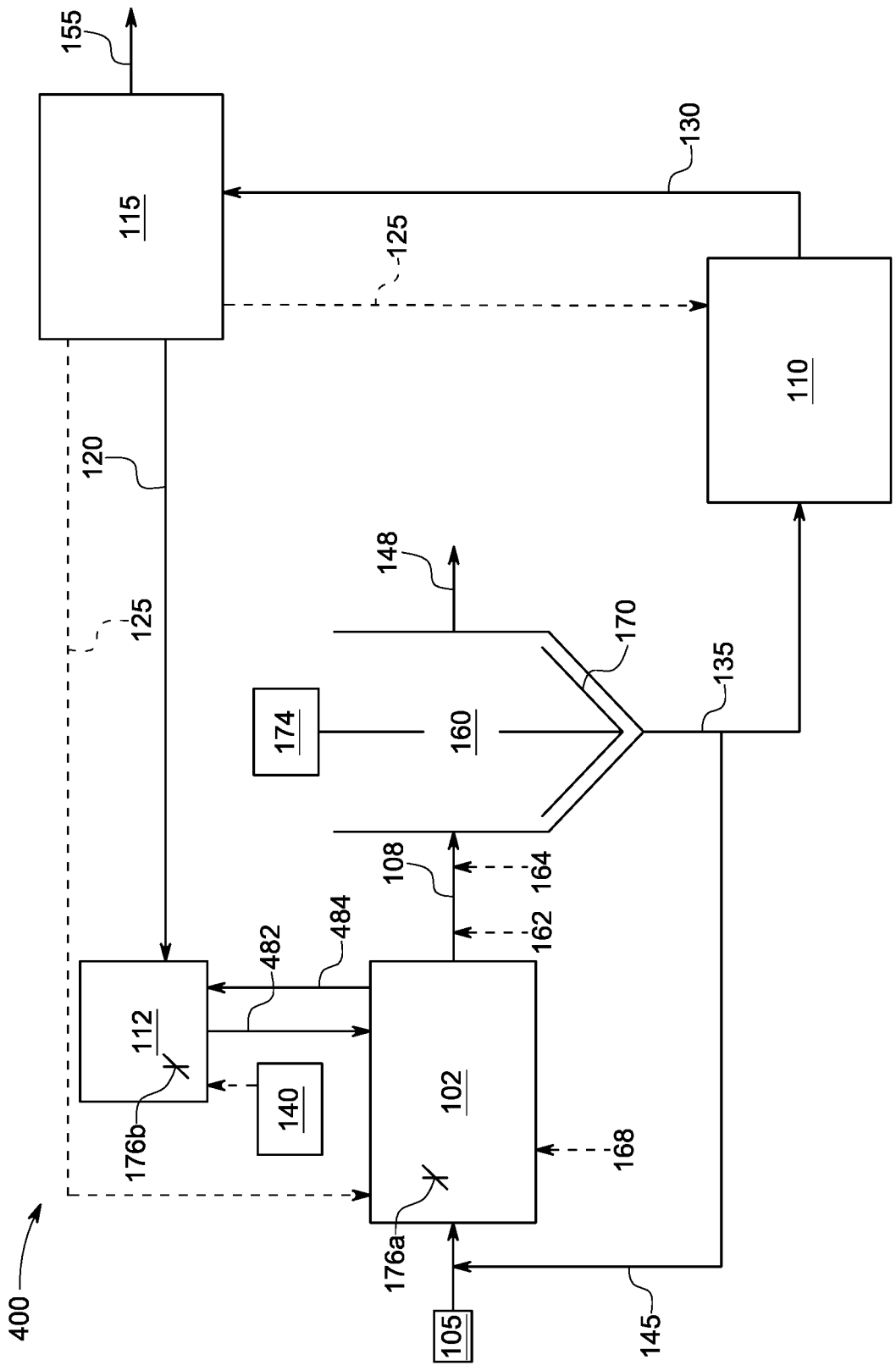
FIG. 4 is a schematic of one example of a portion of a wastewater treatment system in accordance with aspects of the present disclosure.

According to some embodiments, at least a portion of the recovered WAS 125 may be introduced to the impregnation system 112 of either the treatment subsystem 110, or the impregnation system 112 discussed below in reference to the biological reactor 102 of the system 400 shown in FIG. 4. The recovered WAS 125 contains floc material that can be weighted to form weighted biological floc that aids in separation processes.

Recovered WAS not recirculated to at least one of the biological reactor 102 and treatment subsystem 110 may exit the system 100 as wasted unballasted WAS 155 (and when passed through the digester 116 of the treatment subsystem 110 may also be digested) and sent for further processing and/or to waste. This may be done to control the population of microorganisms in the biological reactor 102 and/or treatment subsystem 110. Recirculation of the recovered WAS 125 also reduces the amount of wasted unballasted WAS 155 that is sent to waste.

In accordance with one embodiment, the use of magnetic ballast may provide advantages over the use of other types of ballast material, such as sand. For instance, a magnetic drum may be included in the ballast recovery system 115 that functions to separate the biological solids (i.e., recovered WAS 125) from the magnetic ballast in an efficient manner. According to some embodiments, cleaning solutions are unnecessary in separating ballast from WAS material.

The ballast recovery system 115 may include any known apparatus or device(s) for separating ballast from sludge.

Figure 2A:
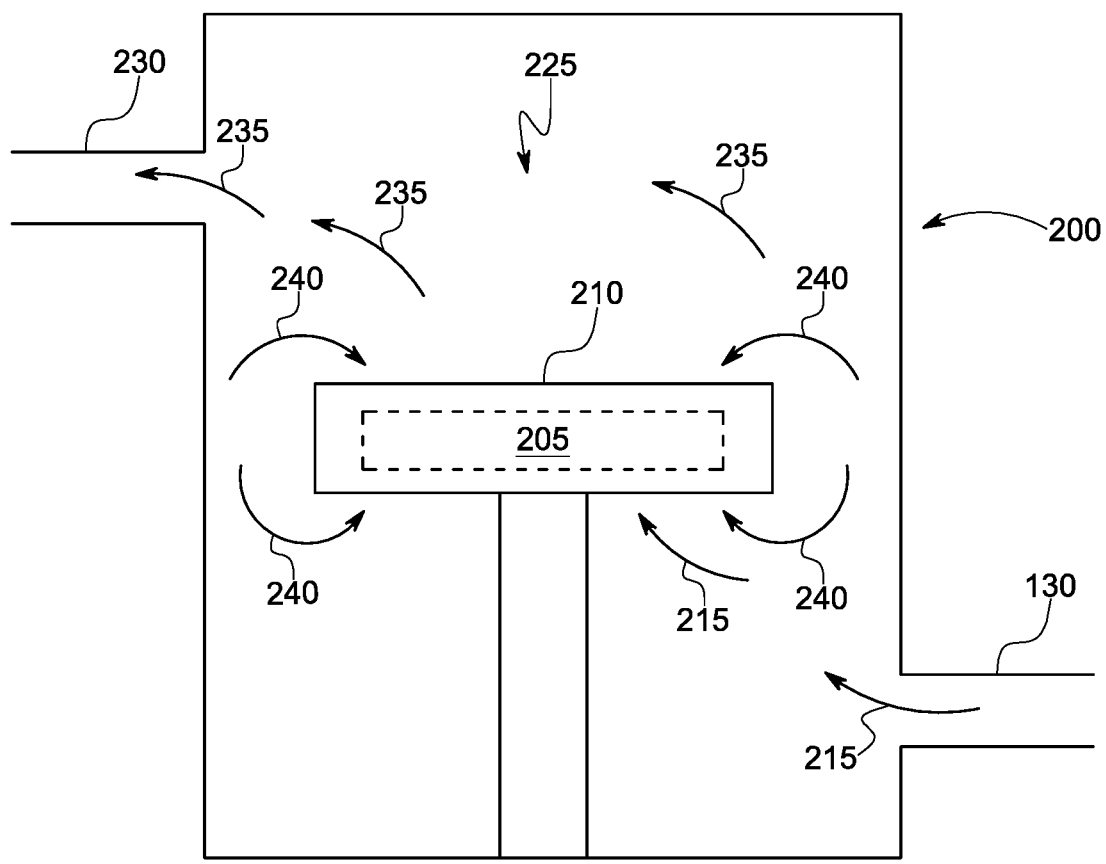
FIG. 2A is a schematic of a shear mill in accordance with aspects of the present disclosure.
Figure 2B:
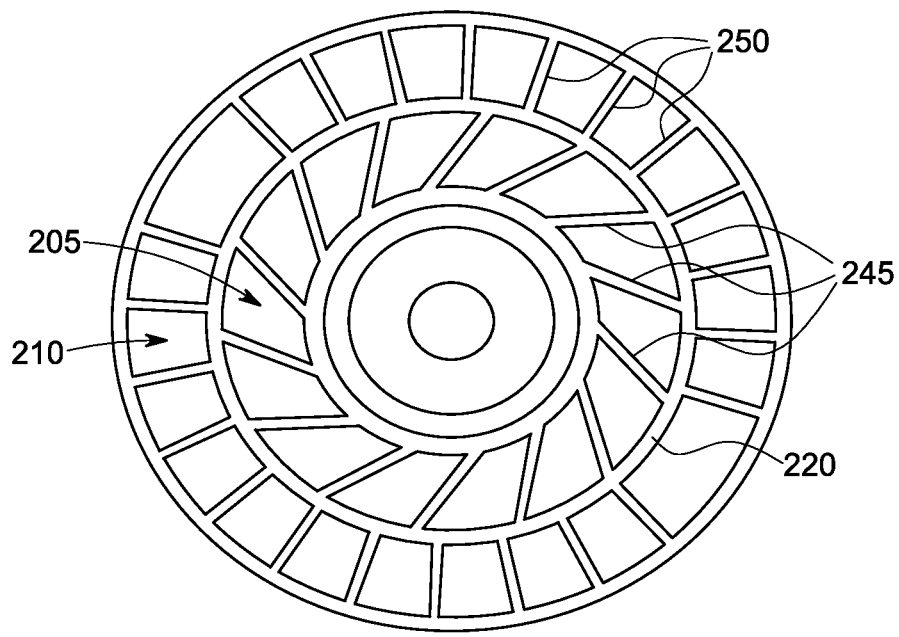
FIG. 2B is an illustration of a rotor and stator of the shear mill of FIG. 2A.

According to one example, the ballast recovery system 115 includes a shear mill as illustrated generally at 200 in FIGS. 2A and 2B. The shear mill 200 shears the ballasted digested WAS to separate the ballast from the sludge. The shear mill 200 may includes a rotor 205 and stator 210. In operation, the ballasted digested sludge 130 enters the shear mill 200 and flows in the direction of arrows 215 and enters the rotor 205 and then the stator 210. The shear mill 200 may be designed such that there is a close tolerance between the rotor 205 and the stator 210, as shown at 220 in FIG. 2B. The rotor 205 is in some embodiments driven at high rotational speeds, for example, greater than about 1,000 rpm to form a mixture of ballast and substantially ballast free obliterated flocs of sludge in area 225 (FIG. 2A) of the shear mill 200. The mixture of ballast and obliterated flocs exits the shear mill 200 through conduit 230, as shown by arrows 235. The conduit 230, in some embodiments, leads to a separate subsystem of the ballast recovery system 115 that divides the ballast and substantially ballast-free obliterated flocs of sludge into separate streams which are output as recovered ballast 120 and recovered WAS 125 respectively.

In some embodiments the rotor 205 and/or stator 210 include slots which function as a centrifugal pump to draw the sludge from above and below rotor 205 and stator 210, as shown by paths 240 in FIG. 2A. The rotor and stator then hurl the materials off the slot tips at a very high speed to break the ballasted sludge into the mixture of ballast and obliterated flocs of sludge. For example, the rotor 205 may include slots 245, and the stator 210 may include slots 250. The slots 245 in the rotor 205 and/or the slots 250 in the stator 210 may be designed to increase shear energy to efficiently separate the ballast from the ballast containing sludge. The shear developed by the rotor 205 and stator 210 may depend on the width of slots 245 and 250, the tolerance between the rotor 205 and stator 210, and the rotor tip speed. The result is that the shear mill 200 provides a shearing effect that effectively and efficiently separates the ballast from the ballasted sludge to facilitate recovery of the ballast.

According to another example, the ballast recovery system 115 may use ultrasound as a separation mechanism. For example, the ballast recovery system 115 may include one or more ultrasonic transducers. The ultrasonic transducers generate fluctuations of pressure and cavitation in the ballasted and digested WAS 130 (or ballasted WAS 135, as in system 100c of FIG. 1C), which results in microturbulences that produce a shearing effect to create a mixture of ballast and obliterated flocs of sludge to effectively separate the ballast from the recovered WAS 125. The resulting mixture of ballast and obliterated flocs comprising the recovered WAS 125 may exit the ultrasonic separator and pass through a separate subsystem of the ballast recovery system 115 which divides the recovered ballast and substantially ballast free obliterated flocs of sludge into separate streams which are output as recovered ballast 120 and recovered WAS 125, respectively.

According to another example, the ballast recovery system 115 may use centrifugal force as a separation mechanism. For instance, in some embodiments the mixture of ballast and obliterated flocs exiting the shear mill 200 of FIGS. 2A and 2B or the ultrasonic separator described above may be divided into separate streams in a centrifugal separator. The centrifugal separator generates centrifugal force that causes the denser ballast to be separated from the flocs of sludge in the mixture and exit the ballast recovery system as recovered ballast 120. The less dense flocs of sludge exit the ballast recovery system as recovered WAS 125.

According to some embodiments, the ballast recovery system 115 may use centrifugal force alone without a shear mill or ultrasonic separation device. According to other embodiments, the ballast recovery system 115 may include a shear mill, an ultrasonic separator, and/or a centrifugal separator. Other types of separation devices may be included in the ballast recovery system 115. For instance, the ballast recovery system 115 may include a tubular bowl, a chamber bowl, an imperforate basket, a disk stack separator, or other forms of separation systems known by those skilled in the art.

Figure 3A:
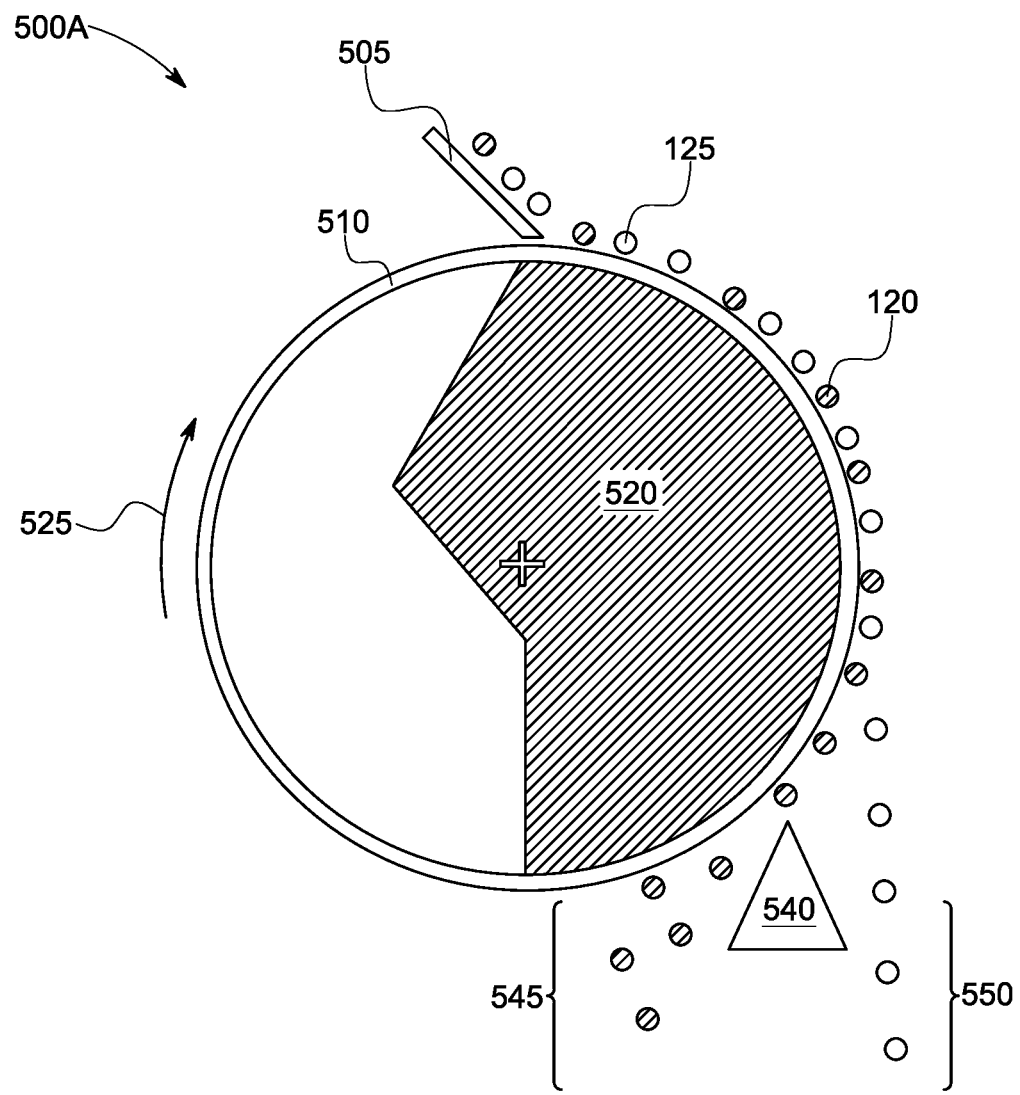
FIG. 3A is an illustration of a magnetic separator in accordance with aspects of the present disclosure.

In some embodiments, ballast recovery system 115 includes a magnetic drum separator. For example, the mixture of ballast and obliterated flocs of sludge exiting the shear mill 200 of FIG. 2A, or exiting an ultrasonic separator as described above may be divided into separate streams in a magnetic drum separator. One example of a magnetic drum separator is indicated generally at 500A in FIG. 3A. The magnetic drum separator 500A includes a drum 510 in which is disposed a magnet 520. The drum rotates in the direction of arrow 525, clockwise in this example. A mixture of ballast 120, represented by the colored circles in FIG. 3A, and obliterated flocs of sludge (recovered WAS 125), represented by the empty circles in FIG. 3A, are introduced to the surface of the rotating drum 510 through a conduit or feed ramp 505. The ballast, when comprised of a magnetic material, for example, magnetite, adheres more strongly to the drum 510 than the obliterated flocs of sludge due to the presence of the magnet 520. The obliterated flocs of sludge will fall off of the drum, in some examples aided by centripetal force generated by the rotating drum, before the ballast. A division vane 540 may separate the recovered ballast 120 and obliterated flocs of sludge (recovered WAS 125) into two separate output streams 545 (as recovered ballast 120), and 550 (as recovered WAS 125), respectively.

Figure 3B:
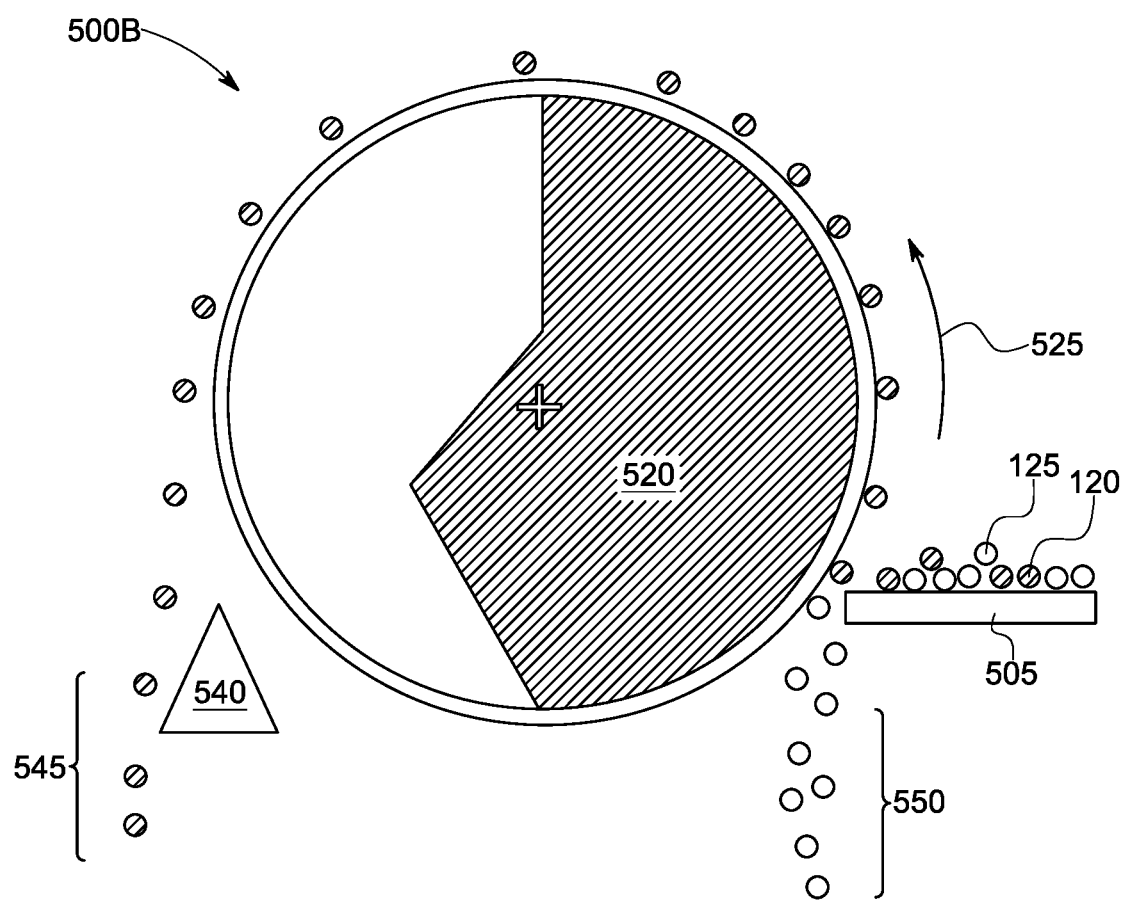
FIG. 3B is another illustration of a magnetic separator in accordance with aspects of the present disclosure.

In another embodiment of the magnetic separator, indicated generally at 500B in FIG. 3B, the mixture of ballast and obliterated flocs of sludge is introduced by a conduit or feed ramp 505 to a position proximate and to the side of the rotating drum 510. The ballast, when comprised of a magnetic material such as magnetite, adheres to the rotating drum 510 due to the presence of the magnet 520 and may be removed from the rotating drum on the opposite side from the conduit or feed ramp 505 by, for example, a scraper or division vane 540. The obliterated flocs of sludge do not adhere to the rotating drum 510 and instead drop from the end of the conduit or feed ramp 505. The result is the production of separate streams 545 (as recovered ballast 120) and 550 (as recovered WAS 125).

The wastewater treatment system 100 may include one or more additional devices that are not explicitly shown in FIG. 1. For instance, according to some embodiments, mixing within the treatment subsystem 110, including one or more of the impregnation system 112, holding tank 114, and digester 116 may be performed and achieved using one or more methods, including mechanical mixers, diffused air, and jet mixers/aerators. Anoxic and anaerobic treatments in the digester 116 may be mixed with either submerged or floating mechanical mixers, and aerobic treatments in the digester 116 may be mixed with either fine or coarse bubble aeration, jet aeration, or any combination thereof. For instance, in some instances fine or coarse aeration may be used with mixing. One or more pumps or valves may also be used in the wastewater treatment system 100 for moving and routing fluids between components of the system. For instance, a pump may be used to pump sludge between one or more components of the treatment subsystem 110, and a pump may be used to recirculate RAS 145 to the biological reactor 102. One or more sensors may also be used in the wastewater treatment system. For instance, sensors may be used to measure one or more physical properties (e.g., TOC) of sludge entering and exiting components of the system, such as the holding tank 114, digester 116, the solids-liquid separation system 160, and/or the biological reactor 102. The controller 150 may be in communication with these sensors and use the measured data to control one or more components of the system, such as the rate of entry or exit of fluids entering or exiting a vessel, residence time, etc.

According to at least one embodiment, an impregnation system 112 may be used for introducing ballast to the biological reactor 102. An example of such a configuration is shown generally at 400 in FIG. 4. The impregnation system 112 functions in a similar manner as the impregnation system discussed above in reference to FIG. 1B. Recovered ballast 120 from the ballast recovery system 115 and/or raw ballast 140 from a source of raw ballast are introduced to the impregnation system 112. The impregnation system 112 mixes mixed liquor 484 from the biological reactor 102 with the recovered ballast 120 and the raw ballast 140 (if used), to impregnate the ballast material into flocs, including biological flocs, suspended in the mixed liquor 484 to form weighted biological flocs 482, which are then introduced to the biological reactor 102. The impregnation system 112 may also include a mixer 176b which provides mixing energy sufficient to impregnate the ballast into the suspended flocs of the mixed liquor 484. One or more additives may also be added to the impregnation system, such as a coagulant, flocculant, and/or adsorbent as previously described.

Returning to FIG. 1, controller 150 can be configured to receive any one or more input signals and generate one or more drive, output, and control signals to any one or more components of the wastewater treatment systems discussed herein. The controller 150 may, for example, receive an indication of a flow rate, a TOC level, or both, of the feed wastewater 105, the WAS (149 or 135) exiting the solids-liquid separation system 160 or the treatment subsystem 110, the RAS 145, the ballasted and digested WAS 130 exiting the treatment subsystem 110, and/or from another position within the system. The controller 150 may generate and transmit a drive signal or otherwise control any of the components of the system, such as the biological reactor 102, the solids-liquid separation system 160, the ballast recovery system 115, the ballast feed system 117 (and including the fresh ballast 140 and the recovered ballast 120), and/or any of the components of the treatment subsystem 110 in response to the input signals. For instance, the controller 150 may generate and transmit a drive signal to the ballast feed system 117, including the fresh ballast 140 and the recovered ballast 120 to, if necessary, adjust the rate of addition of fresh ballast 140 and/or recovered ballast 120 to the impregnation system 112 or the holding tank 114 or the biological reactor 102. The drive signal may be based on one or more input signals and a target or predetermined value or set-point. The target value may be application specific and may vary from installation to installation.

At least one further embodiment is directed to one or more methods of facilitating treatment of wastewater in a wastewater treatment system. The method of facilitating may function to enhance the recovery of ballast in a ballasted process and/or to enhance the settling properties of a waste solids. The method may facilitate improved operations of one or more parts or components or subsystems of a pre-existing treatment system. The method may comprise using one or more of the components of the treatment subsystem disclosed herein together with a pre-existing wastewater treatment system. The method may facilitate improvement in operations of a stand-alone treatment system. The invention contemplates the modification of existing facilities to retrofit one or more systems or components to implement the techniques of the invention. For example, an existing wastewater treatment system may be modified in accordance with one or more embodiments exemplarily discussed herein utilizing at least some of the preexisting components.

The method of facilitating may comprise receiving wastewater from a source of wastewater in a biological treatment unit, biologically treating the wastewater in the biological treatment unit to produce a biologically treated wastewater, settling the biologically treated wastewater to generate waste activated sludge (WAS), providing a ballast feed system configured to deliver ballast to one of the wastewater and the WAS, ballasting the one of the WAS and the wastewater with the delivered ballast to generate ballasted WAS, and digesting at least a portion of the ballasted WAS to produce ballasted and digested WAS. According to aspects of this example, a ballasted process may implement a treatment subsystem as discussed herein comprising a digester 116 and optionally, a holding tank 114.

According to another aspect, the method of facilitating can comprise receiving wastewater from a source of wastewater in a biological treatment unit, biologically treating the wastewater in the biological treatment unit to produce a biologically treated wastewater, settling the biologically treated wastewater to generate waste activated sludge (WAS), providing a ballast feed system configured to deliver ballast to the WAS, and ballasting the WAS with the delivered ballast to generate ballasted WAS. According to aspects of this example, an unballasted process may implement a treatment subsystem as discussed herein comprising a holding tank 114, and optionally an impregnation system 112 and/or a digester 116. This configuration allows for existing secondary separation processes that do not use ballast to implement ballast downstream from the secondary clarifier and enhance sludge settling properties.

Having thus described several aspects of at least one example, it is to be appreciated that various alterations, modifications, and improvements will readily occur to those skilled in the art. For instance, examples disclosed herein may also be used in other contexts. According to another example, an existing facility or process may be modified to utilize or incorporate any one or more aspects of the disclosure. Thus, in some cases, the apparatus and methods may involve connecting or configuring an existing facility to comprise one or more of the components of the treatment subsystem disclosed herein. Such alterations, modifications, and improvements are intended to be part of this disclosure, and are intended to be within the scope of the examples discussed herein. Accordingly, the foregoing description and drawings are by way of example only.

What is claimed is:

1. A system for treating wastewater, comprising:
   a biological reactor having an inlet in fluid communication with a source of wastewater and an outlet, the biological reactor configured to treat wastewater from the source of wastewater and output a biologically treated wastewater from the outlet;
   a solids-liquid separation system having an inlet in fluid communication with the outlet of the biological reactor and configured to separate the biologically treated wastewater into a solids-lean effluent and a solids-rich waste activated sludge (WAS);
   a treatment subsystem comprising a digester, an inlet in fluid communication with a WAS outlet of the solids-liquid separation system, and an outlet for providing ballasted and digested WAS; and
   a ballast feed system configured to deliver ballast to the WAS downstream of the biological reactor.

2. The system of claim 1, further comprising a ballast recovery system configured to receive the ballasted and digested WAS from the outlet of the treatment subsystem.

3. The system of claim 2, wherein the ballast recovery system is further configured to separate unballasted digested WAS from ballast in the ballasted and digested WAS, and to provide recovered ballast as a source of ballast that is delivered to one of the biological reactor and the treatment subsystem.

4. The system of claim 1, wherein the digester of the treatment subsystem has an inlet for receiving ballasted WAS and is configured to provide the ballasted and digested WAS to the outlet of the treatment subsystem.

5. The system of claim 4, wherein the ballast feed system is further configured to feed ballast to the biological reactor.

6. The system of claim 4, wherein the WAS provided by the solids-liquid separation system is the ballasted WAS received by the inlet of the digester.

7. The system of claim 4, wherein the treatment subsystem further comprises a holding tank positioned upstream from the digester and having an outlet for providing the ballasted WAS to the inlet of the digester.

8. The system of claim 7, wherein the holding tank is configured to thicken the ballasted WAS.

9. The system of claim 7, wherein the holding tank is in fluid communication with the inlet of the treatment subsystem, and the ballast feed system is configured to feed ballast to the holding tank of the treatment subsystem.

10. The system of claim 9, wherein the holding tank is configured to incorporate ballast into the WAS to generate the ballasted WAS.

11. The system of claim 7, wherein the treatment subsystem further comprises a ballast impregnation system in fluid communication with the inlet of the treatment subsystem and positioned upstream from the holding tank, and the ballast feed system is configured to feed ballast to the ballast impregnation system.

12. The system of claim 11, wherein the ballast impregnation system is configured to incorporate ballast into the WAS to generate the ballasted WAS and provide the ballasted WAS to an inlet of the holding tank.

13. The system of claim 1, wherein the ballast comprises at least one of a magnetic material and sand.

14. The system of claim 13, wherein the magnetic material is magnetite.

15. A method for treating wastewater, comprising:
   receiving wastewater from a source of wastewater in a biological treatment unit;
   biologically treating the wastewater in the biological treatment unit to produce a biologically treated wastewater;
   settling the biologically treated wastewater to generate waste activated sludge (WAS);
   ballasting the WAS with a ballast to generate ballasted WAS; and
   digesting at least a portion of the ballasted WAS to produce ballasted and digested WAS.

16. The method of claim 15, further comprising passing the ballasted and digested WAS through a ballast recovery system to produce recovered ballast and unballasted digested WAS.

17. The method of claim 16, wherein ballasting the WAS with the ballast comprises introducing recovered ballast to the WAS after settling and prior to digesting.

18. The method of claim 16, wherein ballasting the WAS comprises introducing the recovered ballast to a ballast impregnation system and impregnating the WAS with the recovered ballast.

19. The method of claim 15, further comprising thickening the ballasted WAS prior to digestion.

* * * * *